(12) United States Patent
Seibold

(10) Patent No.: US 11,077,782 B2
(45) Date of Patent: Aug. 3, 2021

(54) VEHICLE SEAT WITH EXTENDABLE AND RETRACTABLE OTTOMAN

(71) Applicant: Adient Engineering and IP GmbH, Burscheid (DE)

(72) Inventor: Kurt Seibold, Farmington Hills, MI (US)

(73) Assignee: Adient Engineering and IP GmbH, Burscheid (DE)

( * ) Notice: Subject to any disclaimer, the term of this patent is extended or adjusted under 35 U.S.C. 154(b) by 21 days.

(21) Appl. No.: 16/474,214

(22) PCT Filed: Dec. 22, 2017

(86) PCT No.: PCT/US2017/068139
§ 371 (c)(1),
(2) Date: Jun. 27, 2019

(87) PCT Pub. No.: WO2018/125789
PCT Pub. Date: Jul. 5, 2018

(65) Prior Publication Data
US 2019/0351800 A1 Nov. 21, 2019

Related U.S. Application Data

(60) Provisional application No. 62/439,285, filed on Dec. 27, 2016.

(51) Int. Cl.
*B60N 3/06* (2006.01)
*B60N 2/02* (2006.01)

(52) U.S. Cl.
CPC ...... *B60N 3/06* (2013.01); *B60N 2/02* (2013.01)

(58) Field of Classification Search
None
See application file for complete search history.

(56) References Cited

U.S. PATENT DOCUMENTS

| | | | | |
|---|---|---|---|---|
| 2,324,318 | A * | 7/1943 | Niedringhaus | A47C 7/028 297/285 |
| 4,664,099 | A * | 5/1987 | Pearl, Jr. | A61F 5/04 602/33 |
| 5,588,708 | A | 12/1996 | Rykken et al. | |
| 6,267,445 | B1 | 7/2001 | Marais | |
| 6,375,261 | B1 * | 4/2002 | Link | A47C 1/023 297/284.11 |
| 6,890,030 | B2 * | 5/2005 | Wilkerson | A47C 1/023 297/284.11 |

(Continued)

*Primary Examiner* — David E Allred
(74) *Attorney, Agent, or Firm* — Marshall & Melhorn, LLC

(57) ABSTRACT

A vehicle seat includes a seat base, a backrest connected to the seat base and an leg rest assembly, also referred to as a leg rest assembly. The leg rest assembly includes a deflectable leg support panel pivotably connected to the seat base. The deflectable leg support panel and deflects under a load of legs of the user and returns with a restoring force back to an initial position upon removing the load of the legs of the user. The leg rest assembly may be connected to the vehicle seat by a pivoting structure, that allows the leg rest assembly to be pivoted to a non use position. The leg rest assembly may also be fixedly connected to the vehicle seat a support base front cross structure. This fixed connection then forms an only pivot axis of the leg rest assembly.

11 Claims, 18 Drawing Sheets

(56) References Cited

U.S. PATENT DOCUMENTS

| | | | |
|---|---|---|---|
| 7,669,929 B2* | 3/2010 | Simon | B60N 2/0284 |
| | | | 297/284.11 |
| 8,444,226 B2 | 5/2013 | Driessen et al. | |
| 8,708,417 B2 | 4/2014 | Mejuhas | |
| 9,016,783 B2* | 4/2015 | Line | B60N 2/0284 |
| | | | 297/284.11 |
| 9,016,784 B2* | 4/2015 | Line | B60N 2/0232 |
| | | | 297/284.11 |
| 9,173,492 B1* | 11/2015 | Fortin | A47C 1/03261 |
| 10,449,878 B2* | 10/2019 | Sala | B60N 2/0224 |
| 10,800,292 B2* | 10/2020 | Tsukamoto | B60N 2/68 |
| 2009/0174242 A1* | 7/2009 | Kohl | B60N 2/0284 |
| | | | 297/284.11 |
| 2009/0224584 A1* | 9/2009 | Lawall | B60N 2/002 |
| | | | 297/311 |
| 2010/0194169 A1 | 8/2010 | Shinozuka | |
| 2011/0006573 A1 | 1/2011 | Arakawa et al. | |
| 2011/0260506 A1 | 10/2011 | Kuno | |
| 2013/0320730 A1* | 12/2013 | Aselage | B60N 2/0284 |
| | | | 297/337 |
| 2016/0137104 A1* | 5/2016 | Bortolon | B60N 2/99 |
| | | | 297/284.11 |
| 2018/0229624 A1* | 8/2018 | Abe | B60N 2/02 |
| 2018/0236901 A1* | 8/2018 | Abe | A47C 7/14 |
| 2019/0104852 A1* | 4/2019 | Stroman | A47C 7/68 |
| 2019/0184858 A1* | 6/2019 | Anzenberger | B60N 2/0284 |
| 2021/0070203 A1* | 3/2021 | Seibold | B60N 2/0284 |

* cited by examiner

VEHICLE SEAT WITH EXTENDABLE AND RETRACTABLE OTTOMAN

CROSS REFERENCE TO RELATED APPLICATIONS

This application claims the benefit of priority of U.S. provisional application 62/439,285, filed Dec. 27, 2016, the entire contents of which are incorporated herein by reference.

FIELD OF THE INVENTION

The present invention relates to a vehicle seat and more particularly to a vehicle seat with an ottoman (also known as a leg rest) that can be moved between a use position, for supporting the legs of a user of the seat, and a retracted stowed position.

BACKGROUND OF THE INVENTION

Vehicle seats with leg rests are known that extend outwardly from the seat base (also known as the cushion). Such a leg rest or ottoman may be provided such that the ottoman can be moved between a use position, extending outwardly from the seat cushion, to a retracted stowed position, such as underneath the seat cushion.

Vehicle seats are known with an ottoman feature (leg rest) which swings out to a use position from a stowed position. The arrangements typically include multiple pivots including a pivot and link structure providing a swing out motion as well as a pivot and link structure providing support during use. U.S. Pat. No. 8,444,226 discloses a vehicle seat with a leg rest assembly including a pan assembly with a leg rest pan that can be moved between a use position and a stowed position. The leg rest pan assembly is connected to the seat cushion arrangement with numerous support links. This provides several pivot points. The leg rest pan assembly positions the leg rest pan, in a stowed position, not fully under the seat cushion. The support links occupy a great deal space and add weight to the overall arrangement.

U.S. Pat. No. 8,708,417 discloses a vehicle seat with a leg rest mechanism adapted for at least partially supporting a passenger's weight. A mechanism connects a support member to a seat cushion. The support member includes multiple support connections including a pivot and a slide and guide arrangement. The overall construction adds significant weight to the vehicle seat. Further, the support member extends outwardly from the seat cushion in the use position but in the stowed position extends only downwardly, at a right angle relative to the seat cushion.

SUMMARY OF THE INVENTION

It is an object of the invention to provide a vehicle seat with a leg rest structure (ottoman) that provides a load distribution on the calf of the occupant and that is connected with the seat cushion without the structural need or kinematic need of plural pivots and without a rigid and heavy support and movement system.

It is further an object of the invention to provide a vehicle seat with a leg rest structure (ottoman) that can be stowed compactly under the seat cushion and particularly which can be positioned adjacent to and essentially parallel to the seat cushion so as to allow positioning of the seat cushion in a stadium seating position, essentially without occupying additional space.

According to the invention, a leg rest (ottoman) is provided, in particular an ottoman assembly with a leg support panel that is resilient and elastically deflects at least somewhat upon forces being applied by the resting legs (calves) of the occupant, so as to elastically conform to the legs of the occupant. The connection between the seat cushion and the ottoman assembly has only a single pivot or single connection location that provides movement to a use position and to a stowed position and also provides support in the use position and in the stowed position. The vehicle seat ottoman (leg rest) system uses a compliant panel, such as spring steel, wherein the surface of the panel conforms and distributes loads across the occupant.

According to the invention a vehicle seat is provided comprising a seat base, a backrest connected to the seat base and an ottoman (leg rest) assembly. The leg rest assembly comprises a deflectable leg support panel connected to the seat base. The deflectable leg support panel deflects under a load of legs of the user and returns, with a restoring force, back to an initial position upon removing the load of the legs of the user.

The leg rest assembly may further comprise brackets connected to the deflectable leg support panel and connecting the vehicle seat to the deflectable leg support panel. The deflectable leg support panel deflects relative to the brackets.

The leg rest assembly may further comprise support bearings connected to the seat base and a support tube mounted for rotation at the support bearings. The brackets are fixed on the support tube for rotation with the support tube relative to the seat base.

The leg rest assembly may comprise a support assembly comprising the support tube, the brackets and the deflectable leg support panel as a unitary assembly.

The leg rest assembly may further comprise a drive mechanism whereby the deflectable leg support panel is movable between a use position, extending from the seat base, and a stowed position, adjacent to the seat base. The drive mechanism may comprise a driven gear fixed to the support tube and a drive motor assembly comprising a motor and a drive gear connected to the motor for driving the driven gear.

The leg rest assembly may have the deflectable leg support panel fixed to the support base of the vehicle seat and/or fixed to the seat base (cushion) of the vehicle seat. The leg support panel comprises an elastic cantilever member extending from brackets of the support base and/or extending from a front lateral cross structure of the support base. The lateral cross structure may be formed from a tube which forms a fixing location of the elastic cantilever member and an only pivot axis of the leg rest assembly.

The deflectable leg support panel may advantageously comprise the elastic cantilever member extending from the brackets. The elastic cantilever member and the brackets may form a cantilever assembly extending from the support tube. The elastic cantilever member may comprise a spring steel sheet.

The elastic cantilever member may also comprise a plastic form. The plastic form may include a substantially planar upper surface and primary support ribs extending along a lower surface, essentially parallel to a direction of leg extension and support. The plastic form may further comprise additional ribs extending at an angle relative to the primary support ribs. The plastic form may comprise an upper planar surface and a lower honeycomb surface.

The plastic form may include an upper portion with different elastic properties from a lower portion or an upper portion with different density from a lower portion.

The plastic form has a varying modulus (of elasticity). The varying modulus may be formed with varied materials.

The support tube may advantageously form an only fixing location and an only pivot axis of the leg rest assembly.

A foam part may be fixed to a leg engagement surface of the elastic cantilever member.

The elastic cantilever member may be a composite structure. The support panel may have a spring steel base that is overmolded with a plastic. The overmolded plastic may include trim out features.

The elastic cantilever member may be comprised of several layers of spring steel sheet creating a leaf spring to provide a controlled shape. The several layers of spring steel sheet may create a leaf spring with a selection of the configuration controlling a spring rate.

The elastic cantilever member may comprise a composite form. The composite form may include a substantially planar upper surface and primary support ribs extending along a lower surface, essentially parallel to a direction of leg extension and support. The composite form may further comprise additional ribs extending at an angle relative to the primary support ribs. The composite form may include an upper portion with different elastic properties from a lower portion or an upper portion with different density from a lower portion. The composite form may have a varying modulus of elasticity. The varying modulus of elasticity may be provided by a composite structure comprising varied materials.

The ottoman/leg rest arrangement may provide the spring panel arrangement with a foam part fixed to a leg engagement surface of the elastic cantilever member.

The elastic cantilever member may comprise a spring steel base that is overmolded with a plastic. The overmolded plastic may advantageously include trim out features.

According to the invention, a shape and preload of the spring panel arrangement may be controlled by loading the panel via a tensile member at the end of the panel. The tensile member advantageously is a cable. The cable is extended or retracted via a manual clutching system or powered leg support positioning arrangement. The cable is extended or retracted via a power drive mechanism comprising a motor and a drum (reel/spool).

It is apparent that the above-described features, which will also be explained below, can be used not only in the particular combination described, but also in other combinations or alone, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 2:
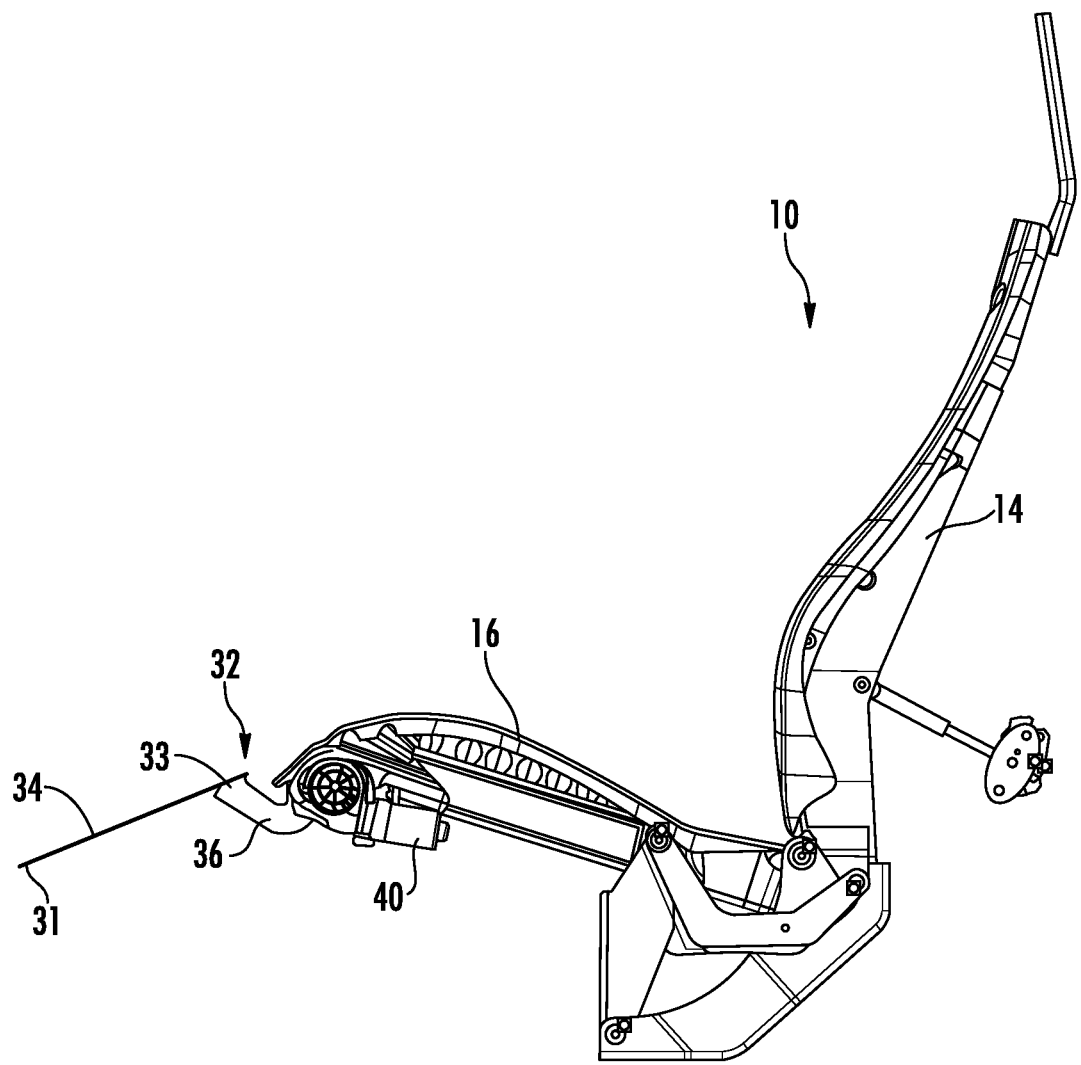
FIG. 2 is a side view of a vehicle seat according to FIG. 1, showing the vehicle seat in an upright use position with the leg rest in a use position.
Figure 3:
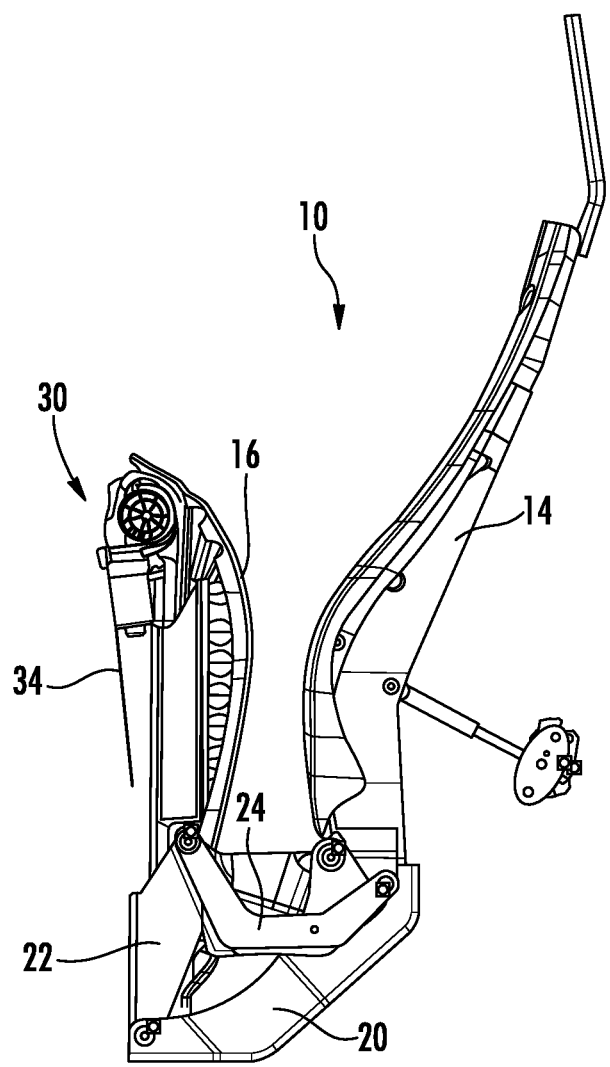
FIG. 3 is a side view of the vehicle seat according to FIG. 1, showing the vehicle seat in a stadium position with the leg rest in a stowed position.
Figure 4:
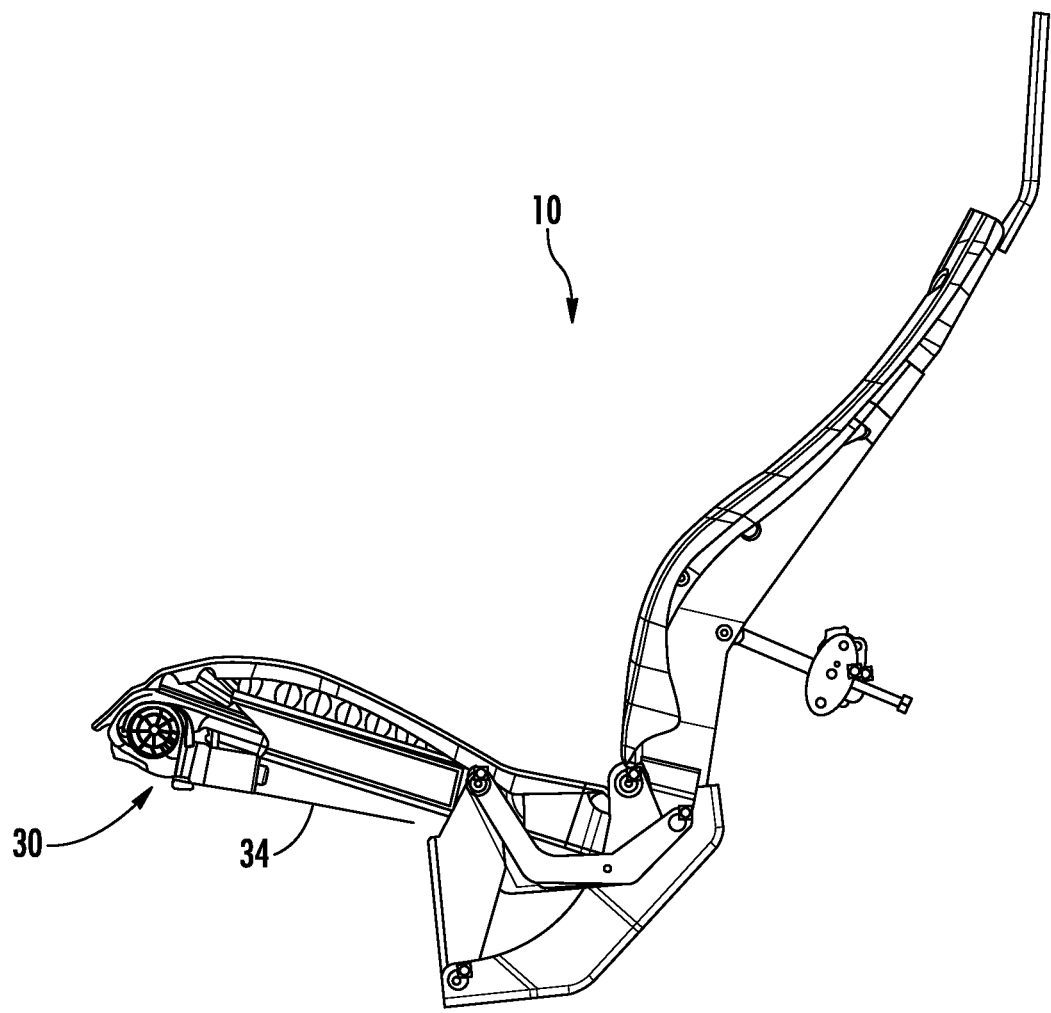
FIG. 4 is a side view of the vehicle seat according to FIG. 1, showing the vehicle seat in a reclined position with the leg rest in a stowed position.
Figure 5:
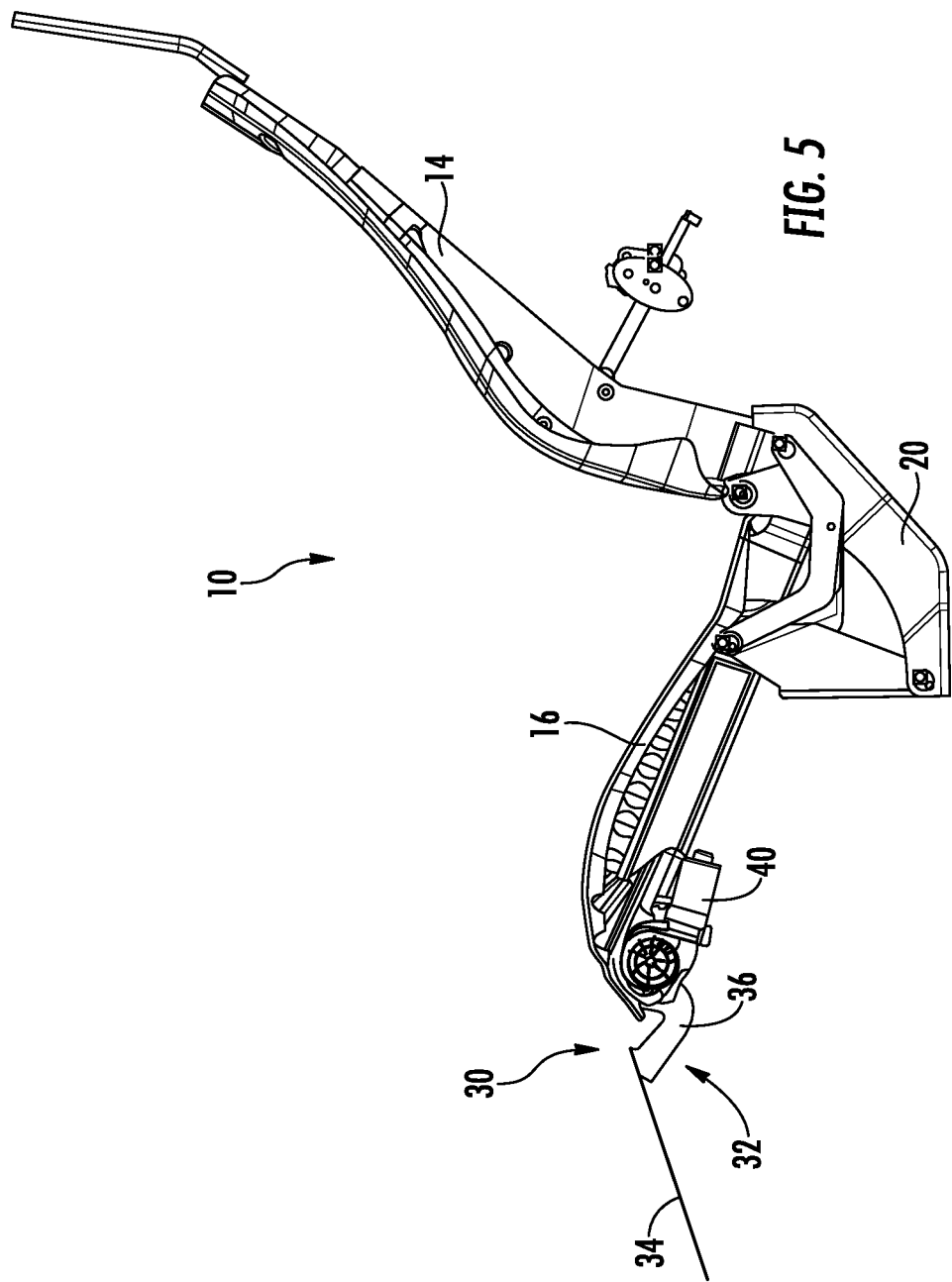
FIG. 5 is a side view of the vehicle seat according to FIG. 1, showing the vehicle seat in a reclined position with the leg rest in a use position.
Figure 9:
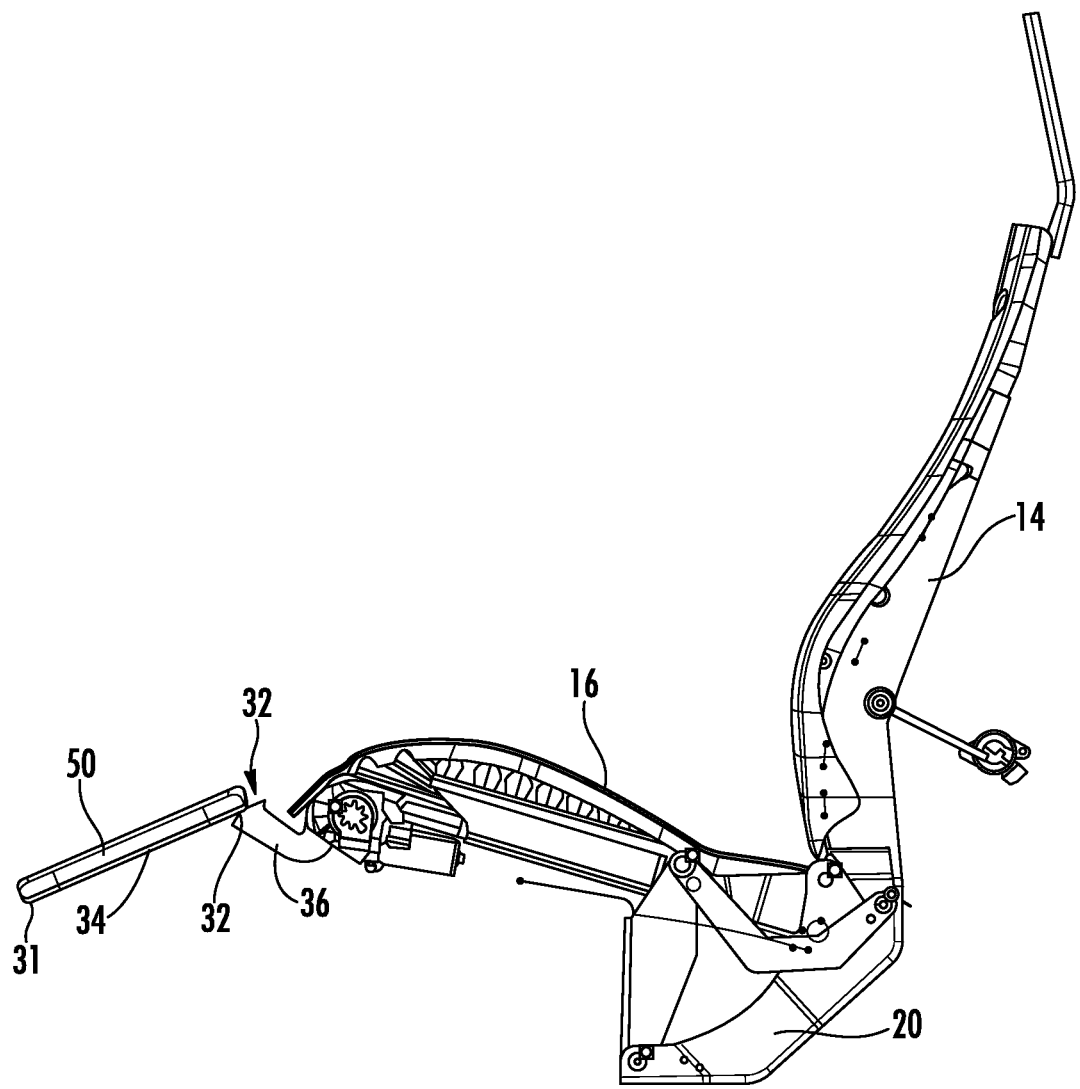
FIG. 9 is a side view of the vehicle seat corresponding to FIG. 2, with the foam piece attached to a leg contact surface of the deflectable leg support panel of the leg rest assembly.
Figure 10:
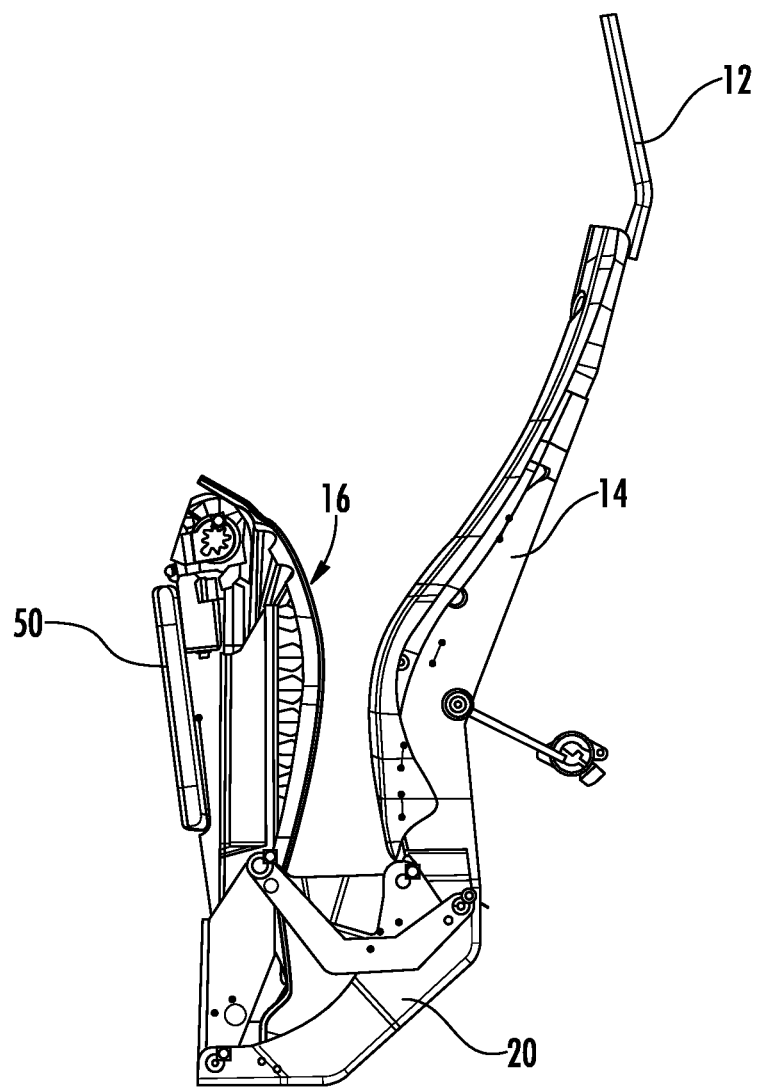
FIG. 10 is a side view of the vehicle seat corresponding to FIG. 3, with the foam piece attached to a leg contact surface of the deflectable leg support panel of the leg rest assembly.

Referring to the drawings, a vehicle seat 10 is provided comprising a headrest 12, a backrest (seatback) 14 and a seat base (cushion) 16. The vehicle seat 10 includes an ottoman arrangement (leg rest arrangement) 30 that allows a deflectable leg support panel 32 to be deployed (FIGS. 2, 5, 6, 7 and 9) and to be stowed (FIGS. 1, 3, 4, and 8). The vehicle seat 10, in particular the backrest 14, is connected to a vehicle structure via a vehicle to backrest support connection 18. The vehicle seat 10 is also connected to a vehicle floor by a vehicle floor engaging bracket 20. The floor engaging bracket 20 is part of a pivot connection between the backrest 14 and the cushion 16. The pivot connection also comprises a linking bracket 22 and a pivot bracket 24. This configuration allows for a pivoting motion of the backrest 14 to recline the backrest 14, moving the backrest 14 from an upright position (FIG. 1) to a reclined position (FIG. 4). The pivot connection arrangement further provides an adjustment of a position of the seat cushion 16, as the backrest 14 reclines. The arrangement further allows the seat cushion 16 to be moved from a use position (FIGS. 1, and 8) to a stadium position (FIGS. 3 and 10).

The vehicle seat 10 is particularly a second row seat or subsequent row seat for a motor vehicle. However, the seat 10 could be a front row seat or could be another type of vehicle seat. Further, although the seat 10 includes the stadium seating feature or features to achieve the stadium seat cushion position (FIGS. 3 and 10), the vehicle seat 10 may be of another type, such as with a pivot fitting. Further, although it is desirable, for the backrest 14 to recline, the reclining feature is not essential. Other types of seat arrangements may be provided according to the invention. For example, the vehicle seat with a seat base and seat back may be connected by a fitting for reclining and or easy entry and may cooperate with a track arrangement for movement of the vehicle seat. The vehicle seat may be a slouch type seat or other non-stadium seat.

The vehicle seat 10 further comprises an ottoman (leg rest) assembly 30. The assembly 30 supports a leg engagement surface—a deflectable leg support panel 34—in a deployed position and supports the surface in a stowed position, adjacent to the seat cushion. The assembly 30 moves the leg engagement surface between the deployed position and the stowed position. According to a preferred embodiment, the assembly 30 includes a support assembly 32 that is comprised of the deflectable leg support panel 34, cantilever brackets 36, support tube 38 and a driven gear 39 (see FIGS. 2, 6 and 7). The deflectable leg support panel 34 extends from a panel and bracket connection area 33 to a panel distal end 31. As can be seen in FIG. 7, the support assembly 32 comprises a cantilever assembly 37. The cantilever assembly 37 includes the cantilever features which extend from the pivot, namely the brackets 36 and the deflectable leg support panel 34.

Figure 6:
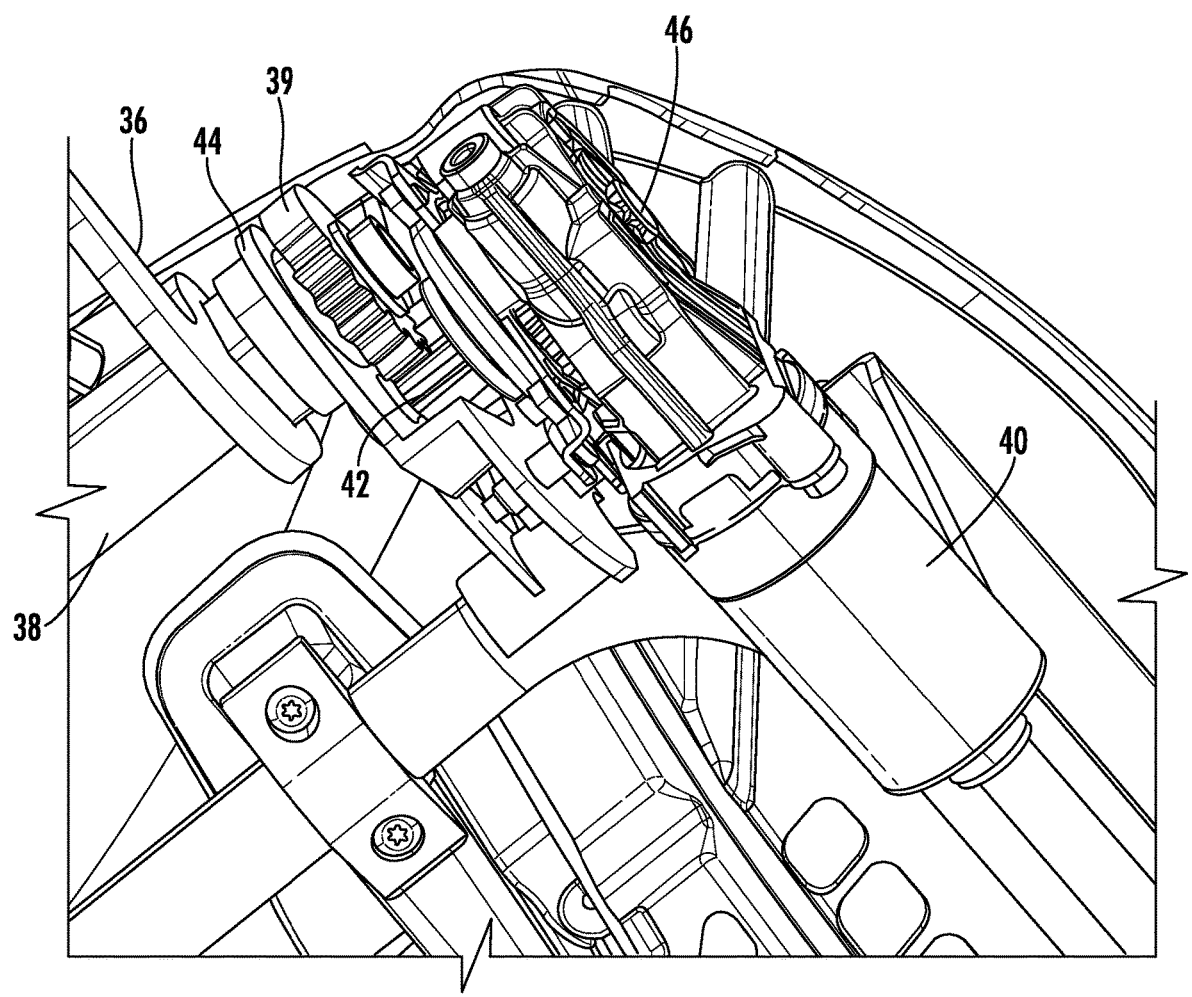
FIG. 6 is a partial bottom view showing a mounted motor and the leg rest assembly drive connection.
Figure 7:
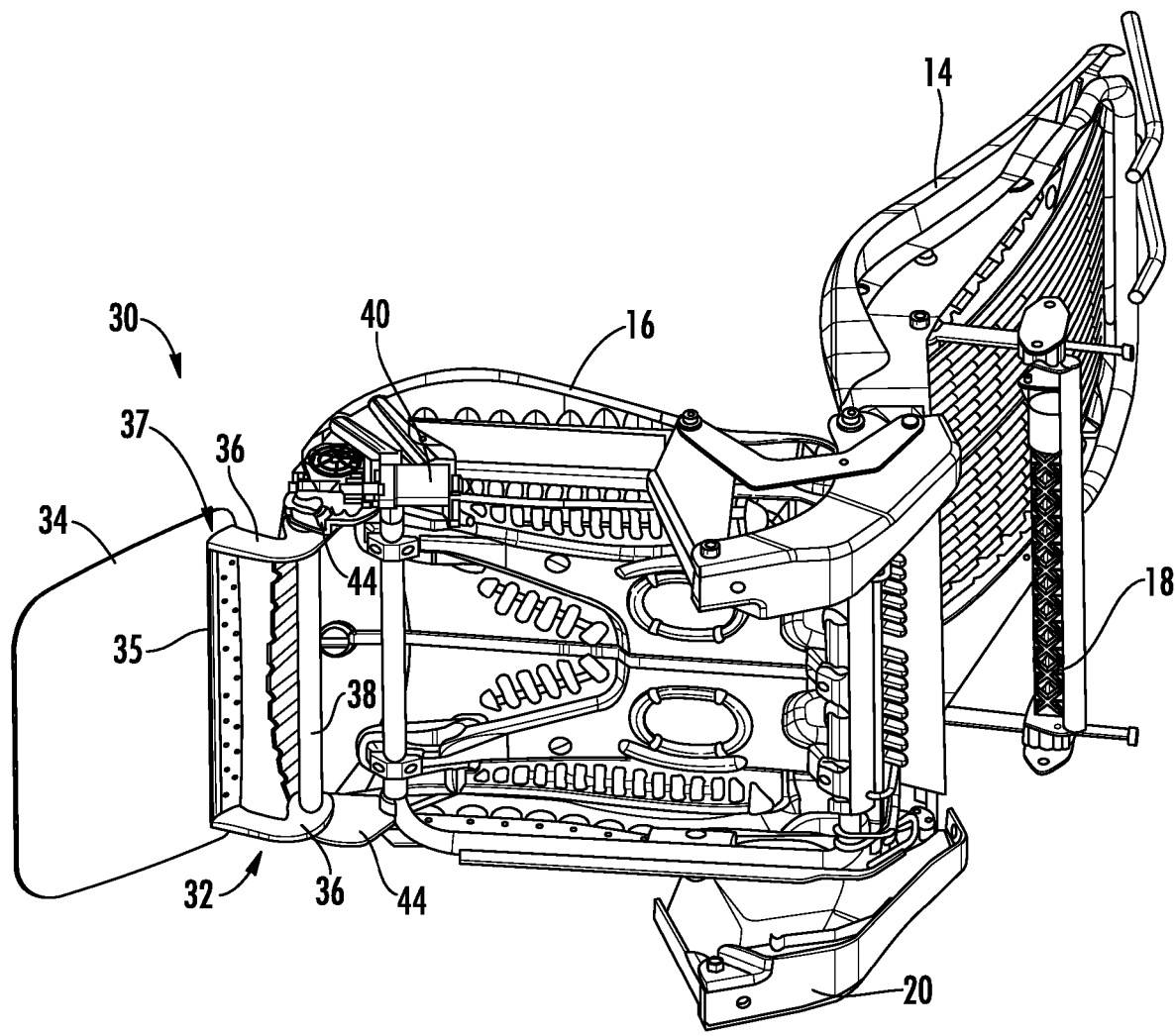
FIG. 7 is a bottom perspective view of the vehicle seat, showing the leg rest assembly and the connection of the leg rest assembly to the seat cushion.

The support assembly 32 is a robust structure based on a unitary assembly with bracket portions 36 welded or otherwise fixed on the support tube 38 (FIG. 6). Advantageously, the driven gear 39 may also be welded or otherwise fixed on the support tube 38. As can best be seen in FIG. 7, the support brackets 36 are formed integrally with a crossmember portion 35. The deflectable leg support panel 34 is welded, riveted or otherwise fixed to the crossmember portion 35. The unitary construction or unitary assembly, including the deflectable leg support panel 34, the crossmember portion 35, the support tube 38 as well as the bracket portions 36 provides a robust support to the deflectable leg support panel 34.

The support assembly 32 is mounted to the cushion 16 with the support tube 38 mounted in bearings provided by leg rest assembly mounting brackets 44. The mounting brackets 44 are fixed to the frame structure of the cushion 16. With the support tube 38 mounted to the mounting brackets 44, the unitary support assembly 32 positions the cantilever assembly 37 so as to extend as a cantilever from the pivot axis of the support tube 38 to the distal end 31 of the deflectable leg support panel 34. Although the brackets 32 and the crossmember portion 39 are essentially rigid, the deflectable leg support panel 34 is formed of as an elastic panel which is resilient and deflects under a load corresponding to the panel being engaged by the legs of the user. The deflectable leg support panel 34 elastically conforms to the legs of the occupant. The deflectable leg support panel 34 has elastic properties such that after the load is removed, the legs of the user are removed, the deflectable leg support panel 34 returns to an initial non-defected state and an initial position. The elastic nature of the support panel 34 is such that there is a restoring force. After the load is removed the shape and position of the panel 34 goes back to an initial shape and position.

The deflectable leg support panel 34 is preferably made of spring steel. The brackets 36 with the crossmember portion 35 may advantageously also be made of steel with these parts welded together. The tube 38 may also be formed of steel such that the support assembly 32, as a unitary support assembly 32, is robust with good connections between the various components and provides a fixed connection of the deflectable leg support panel 34 to the cushion 16. Sheet spring steel with a thickness of 0.5-3.5 mm and with an extent from the connection 33 with the crossmember portion 39 to the distal end 31 of about 420 mm, provides a deflectable leg support panel 34 with particularly advantageous elastic and resilient (with elastic deflecting with restoring force) properties. The size is preferably maximized to fit within the package environment. The deflectable leg support panel 34 could be of a leaf spring arrangement comprising multiple layers of sheet spring steel if variations as to a higher strength or larger deflection is needed.

Figure 8:
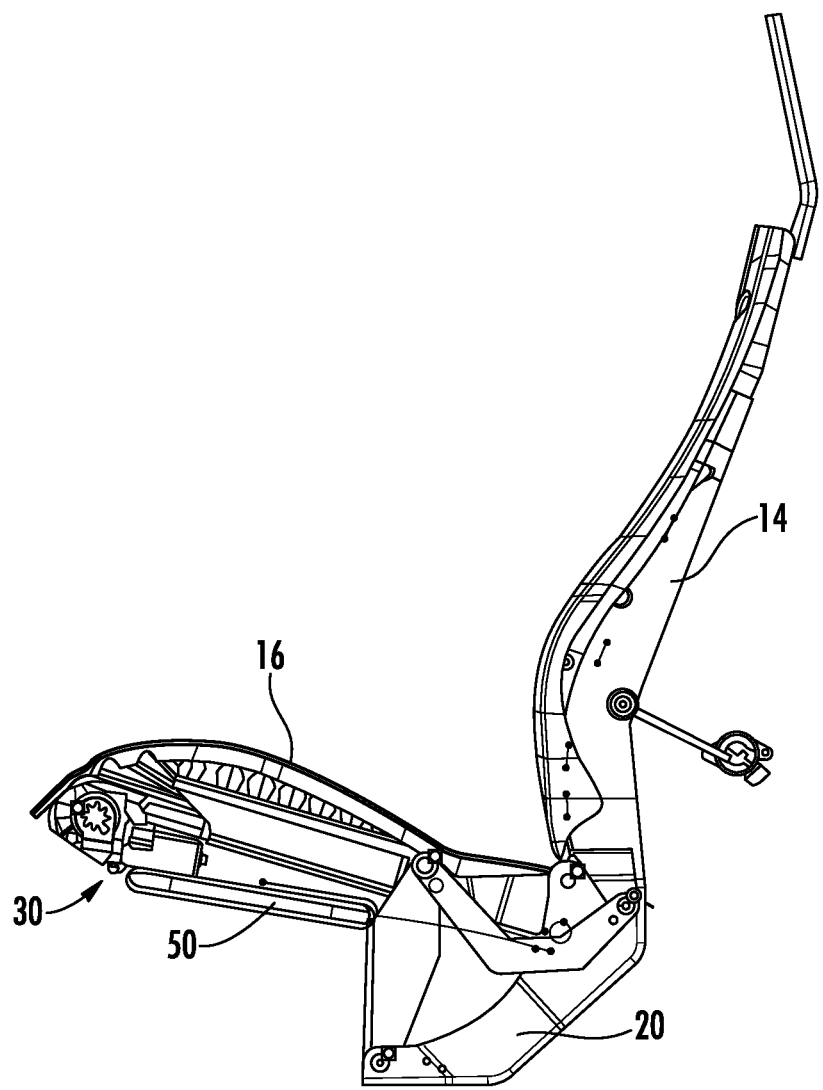
FIG. 8 is a side view of the vehicle seat corresponding to FIG. 1, showing a foam piece attached to a leg contact surface of the deflectable leg support panel of the leg rest assembly.

Trim, including a cover and foam may be provided on the leg rest assembly 30. This may be provided in conjunction with foam and seat covering provided on the cushion 16. A transition slack portion may be provided connecting the two covers. As shown in FIGS. 8-10, the trim may include a foam pad 50 that is fixed, to the deflectable leg support panel 34, by an adhesive or by a mechanical connection. Plural foam pads 50 may be provided instead of a single integral structure. The transition slack portion may include a cover portion as well as a foam backing. The foam pad 50, applied on the deflecting leg support panel 34, will at least slightly change the overall deflecting/elastic and restoring properties. For example, the foam applied as a continuous integral foam pad 50 will slightly dampen the spring characteristics of the deflectable leg support panel 34 formed of spring steel.

Instead of providing the deflecting leg support panel 34 as a spring steel panel, other materials may be provided which also have a spring effect, namely provide elastic qualities with a deflection upon the application of force and with a restoring force upon removing the applied force. The panel 34 may be formed of one or more plastic materials. Thermoplastic Elastomer (TPE) and Thermoplastic Polyurethane provide similar elastic qualities. Further, different plastics or different densities of plastic may be used in combination to vary the elastic properties and achieve the desired resilient deflecting action and restoring force. The deflecting leg support panel 34 formed of plastic may include ribs such as I-beam portions, that preferably extend essentially parallel to the direction of the legs being supported. Further, cross ribs or crossbeams may be integrated into such a plastic panel. Preferably the upper surface of the panel is planar. However, the upper surface of the panel may be textured plastic, particularly to form a better adhesive connection between the plastic support panel 34 and the foam pad 50. The plastic support panel 34 may also have a honeycomb configuration such as a honeycomb configuration at a lower surface with a planar upper surface. Other known techniques for providing the desired elastic properties may be used. Further, the support panel 34 may be formed of a composite including layers of different type or density or characteristic plastic. The composite panel 34 may include foamed plastic forming the foam portion 50 which is integral with and transitions to a denser plastic remainder of the support panel 34, providing both the elastic support features and cushion features of the foam and the panel as a single integral part with varying density and or elastic and cushion properties. The composite panel may also be formed of other materials such as carbon fiber, fiberglass or combinations of plastics and fiber.

The support panel 34 may have a spring steel base that is overmolded with a plastic. The overmolded plastic may include trim out features. The overmolded plastic may have a density that changes or varies and may include foamed plastic forming the foam portion 50. The support panel 34 with the spring steel base may comprise deflections/support features for pivoting and may also include piano hinge features.

Figure 1:
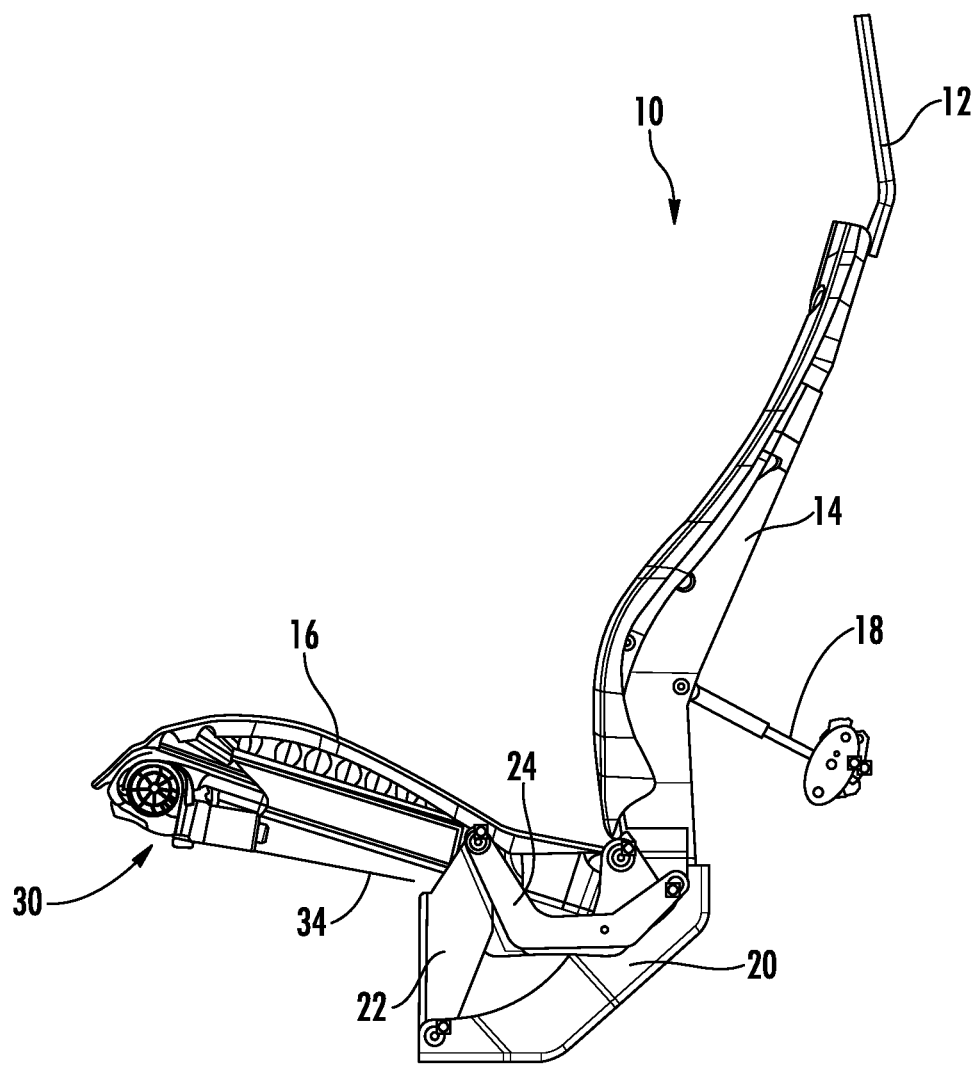
FIG. 1 is a side view of a vehicle seat according to the invention, showing the vehicle seat in an upright use position, with the ottoman (leg rest) in a stowed position.
Figure 11:
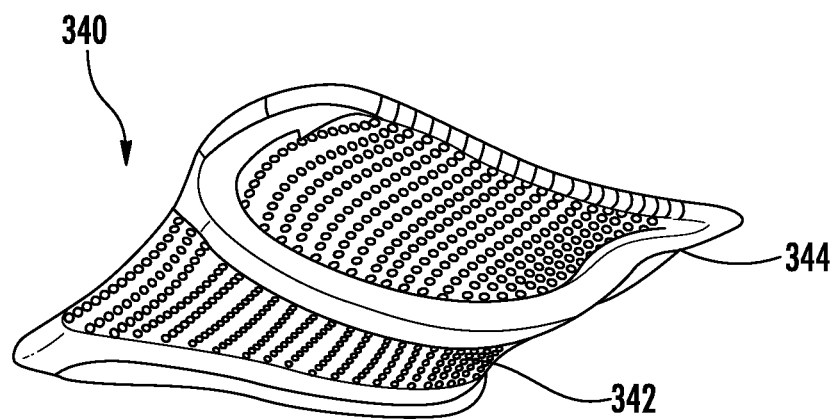
FIG. 11 is a perspective rear view of a deflectable leg support panel of a leg rest assembly according to another embodiment of the invention.

FIG. 11 shows a perspective rear view of a deflectable leg support panel 340 of an leg rest assembly according to another embodiment of the invention. The deflectable leg support panel 340 is a composite structure with a tubular plastic mesh or net plastic structure 342 with an annular metal support 344 at each end. The proximal and upper end of the annular metal support 344 in FIG. 1 provides a surface which is fixed to the brackets 36 and/or the crossmember portion 39 of the vehicle seat of FIG. 1. The brackets 36, the crossmember portion 39 and the tube 38 may be fixed together as a unitary construction with the annular metal support 344. The annular metal support 344 is particularly useful for both supporting the plastic structure 342 and providing a connection of the plastic structure 342 to the unitary support assembly 32, particularly with the annular metal support 344 being provided as a part of the unitary support assembly 32. However, the plastic structure 342 may be provided without a metal support. The plastic structure 342 may be formed of a DuPont Performance Polymers, such as the DuPont high performance thermoplastics DuPont™ Hytrel® TPC-ET and DuPont™ Crastin® PBT. The net plastic structure 342 may be fused to the annular metal support 344.

As shown in FIG. 1, the leg rest assembly 30 can be maintained in a stowed position with the deflecting leg support panel 34 extending adjacent to the cushion 16. In particular, the deflecting leg support panel 34 is adjacent to and essentially parallel to the extent of the cushion 16 and below the cushion 16 in a use position of the cushion 16. The leg rest assembly 30 is particularly advantageous in that it provides extensive space below the cushion 16, even with the leg rest assembly 30 in the stowed position.

As best shown in FIG. 6, the motor 40 is mounted to the support structure of the seat 16, at an underside of the seat 16. The motor 40 extends with a drive shaft in a direction which is essentially at a right angle to the pivot axis of the support tube 38. As such, the motor 40 is connected, via the motor transmission 46, to a drive gear 42. This changes the direction of rotation from the direction of rotation of the motor 42 to the direction of rotation of the drive gear 42. The drive gear 42 engages driven gear 39 such that rotation of the motor in one direction will move the entire support assembly 32—the driven gear 39, the tube 38, the brackets 36 and the deflecting leg support panel 34—from the stowed position shown in FIG. 1 to a deployed position as shown in FIG. 2. Due to resilient deflecting nature of the deflecting leg support panel 34, the deflecting leg support panel 34 conforms to the shape and position of the legs of the user. With the weight of the legs of the user resting (via intermediary foam 50) on the deflecting leg support panel 34, a further movement of the deflecting leg support panel 34 upward or downward, changes the applied pressure on the legs, namely the supporting pressure on the legs can be increased by further rotation of the panel upwardly or may be decreased by rotation of the panel 34 downwardly.

Instead of providing a motor arrangement driving the motion and adjustment of position of the support assembly 32, the leg rest assembly 30 may instead include a manually operable drive. This may include for example a ratchet, clutch or spring-loaded engagement element which locks/sets or fixes a position of the support assembly 32 and allows a release of that position for movement of the support surface 34. An external hand actuator may be provided.

As shown in FIGS. 3 and 10, the vehicle seat 10 includes a stadium seating feature, namely the seat cushion 16 can be moved to an upward stadium seat position. In this regard, the deflecting leg support panel 34, in the stowed position adjacent to the seat cushion 16, closes a region of the underside of seat 16 and occupies very little additional space. Further, with foam 50 and appropriate trim, the appearance of the underside of the seat, in the stadium seat position, is enhanced. Further, with the seat cover of the trim provided over the seat cushion 16 and over foam 50 and support panel 34, the transition slack portion bridges a gap between support panel 34 and seat cushion 16. This preferably has a slack length such that the transition slack portion can wrap around from the foam 50 and support panel 34 to the cushion 16 in the stadium seat position.

Figure 12:
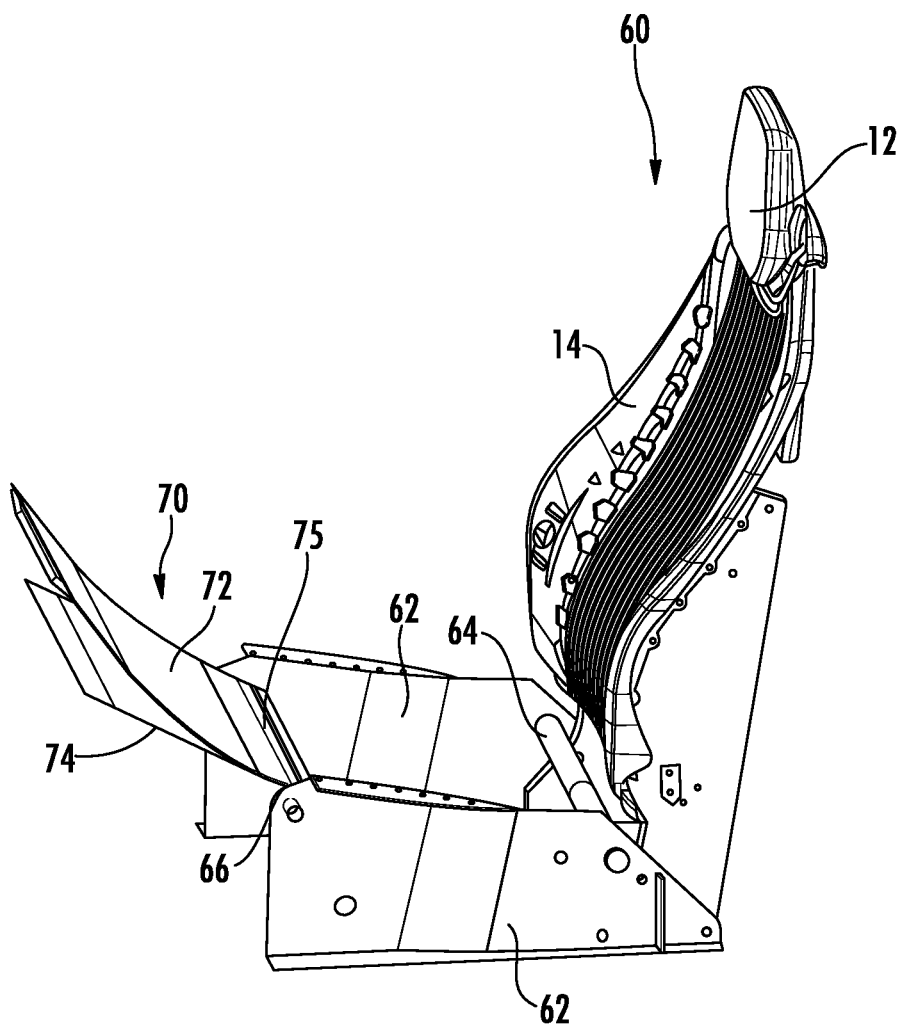
FIG. 12 is a perspective view of a vehicle seat according to a further embodiment of the invention, shown with the seat base part (cushion) removed and showing a deflectable leg support with a leaf spring configuration in an unloaded state.
Figure 13:
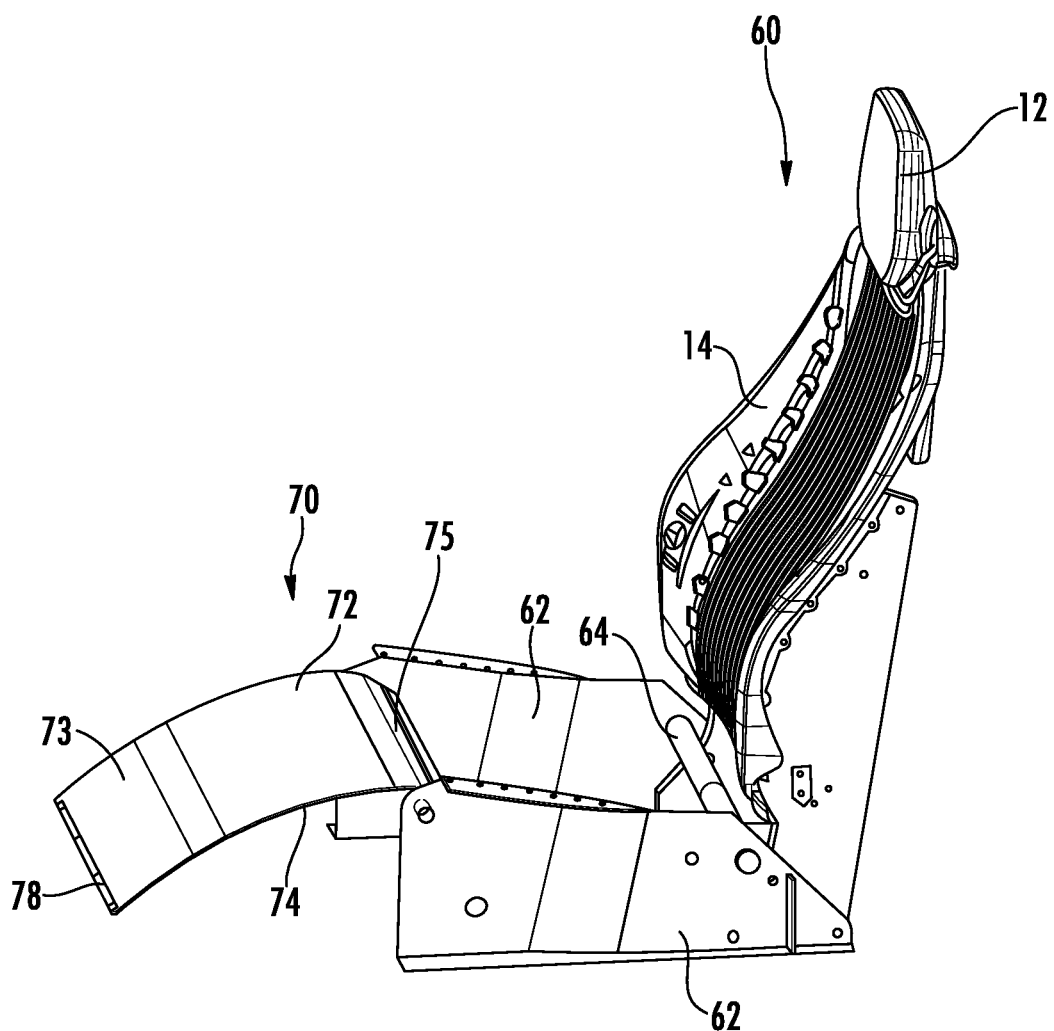
FIG. 13 is a perspective view showing the vehicle seat of FIG. 12, with the seat base part removed and showing the deflectable leg support with a leaf spring configuration in a preloaded design state.
Figure 14:
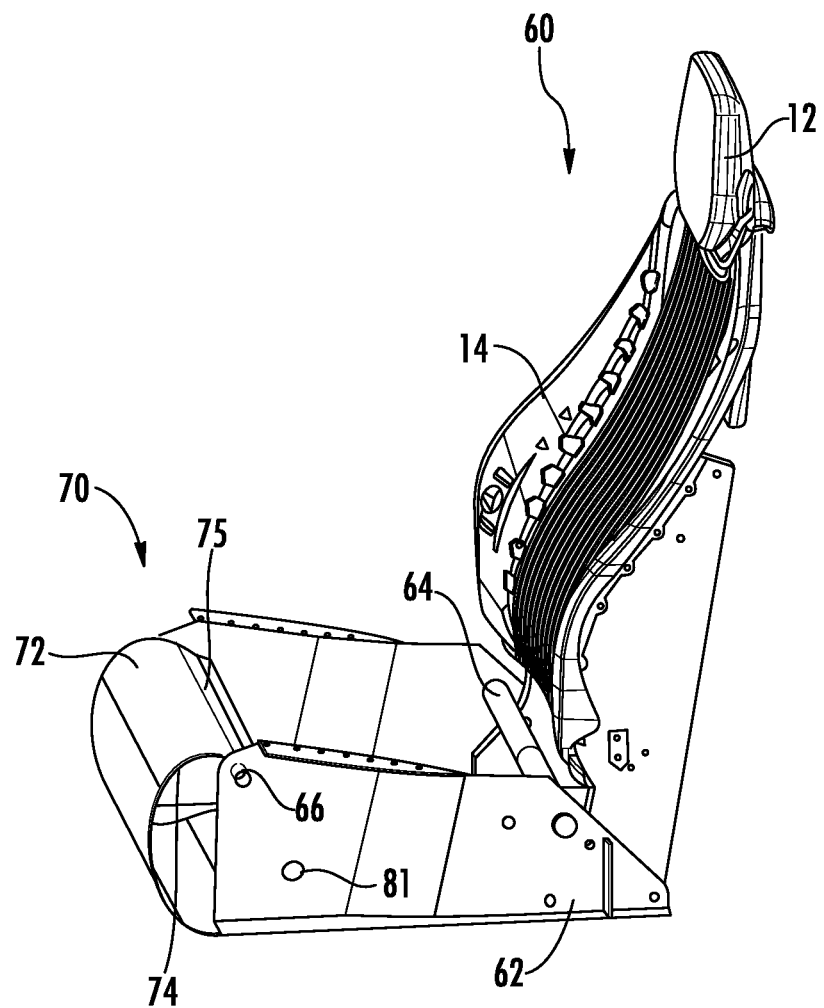
FIG. 14 is a perspective view showing the vehicle seat of FIG. 12, with the seat base part removed and showing the deflectable leg support with a leaf spring configuration in a retracted design state.

FIG. 12 shows a vehicle seat 60 according to a further embodiment of the invention. The vehicle seat 60 comprises a headrest 12 and a backrest (seatback) 14. The vehicle seat 60 includes many features similar to the vehicle seat 10, such as a vehicle seat base 16 (see FIG. 15). However, the vehicle seat 60 includes a leg rest assembly (ottoman assembly) comprising a deflectable leg support panel fixedly connected to the seat base or the support base of the vehicle seat 60. The deflectable leg support panel with a leaf spring configuration (spring panel arrangement) 70 is different from the leg rest arrangement 30 of FIG. 1. The vehicle seat 60 includes the spring panel arrangement 70 connected to the seat base 16 or the support brackets 62 via a seat base and spring panel connection 75. The connection 75 may be the only pivot axis of the deflectable leg support panel/spring panel arrangement) 70. This connection 75 may be a connection in substance such as a welding but preferably is by bolting an upper proximal spring panel 72, or bracket thereof, to a supported part such as tube 66, of the support bracket 62 or to the seat base 16. Although this is a fixed connection, the spring nature of the spring panel (deflectable leg support panel) 72 allows the spring panel arrangement 70 to deflect relative to the connection 75 as the only pivot location.

FIG. 12 shows the spring panel arrangement 70 in a free unloaded state. The spring panel arrangement 70 is formed by plural spring panels, in particular the upper panel 72 and a lower panel 74. By using different materials or thicknesses, it is possible to control the distortion (elastic deformation). In the configuration shown in FIG. 12 the upper panel 72 is a different length from the lower panel 74. The upper panel 72 extends beyond the lower panel 74 to a region 73. With this configuration, the region 73 deflects first under a load. This is due to the region 73 only having a thickness based on the signal layer of the spring panel 72. The respective lengths may be selected such that the entire spring panel arrangement can be tucked under the vehicle seat 60. In particular, a distal end of the spring panel arrangement 70 is deflected so as to extend under the vehicle seat 16.

Figure 15:
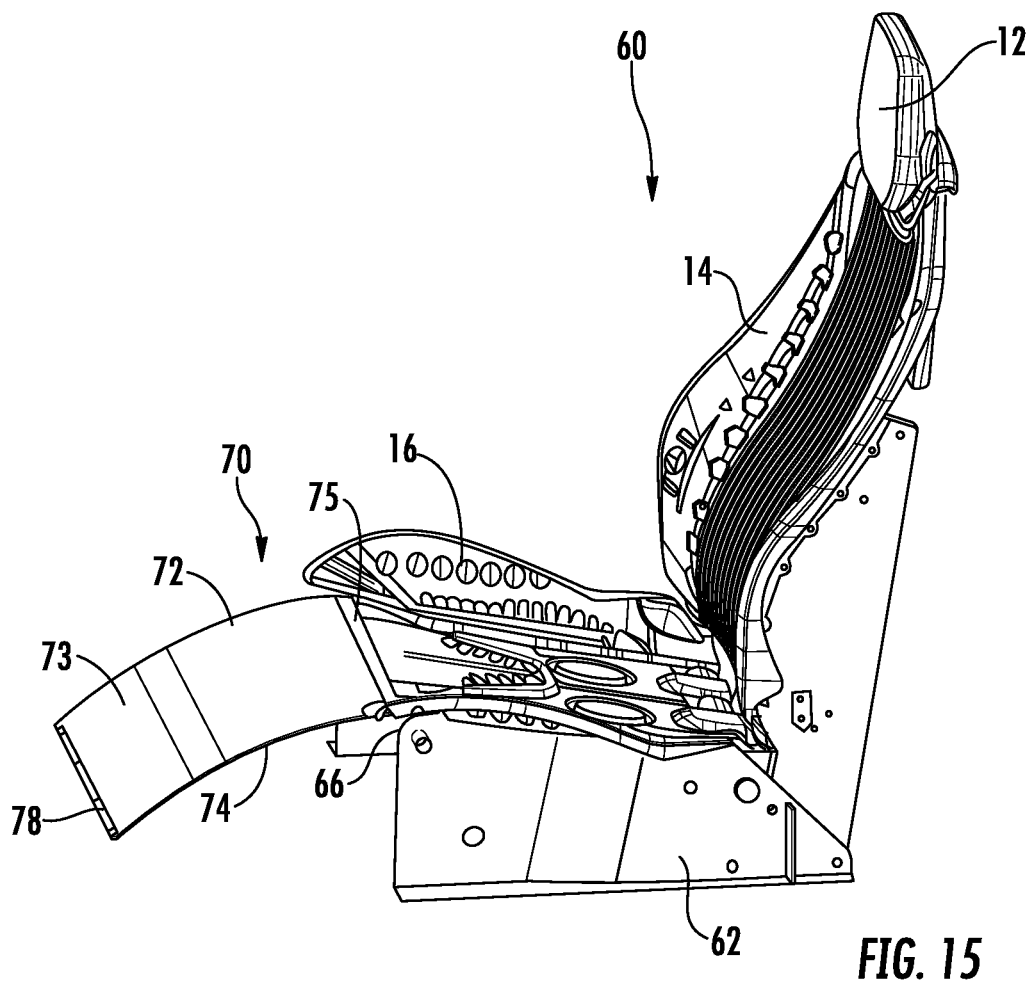
FIG. 15 is a perspective view showing the vehicle seat of FIG. 12, including the seat base part with the spring configuration in a preloaded design state.
Figure 16:
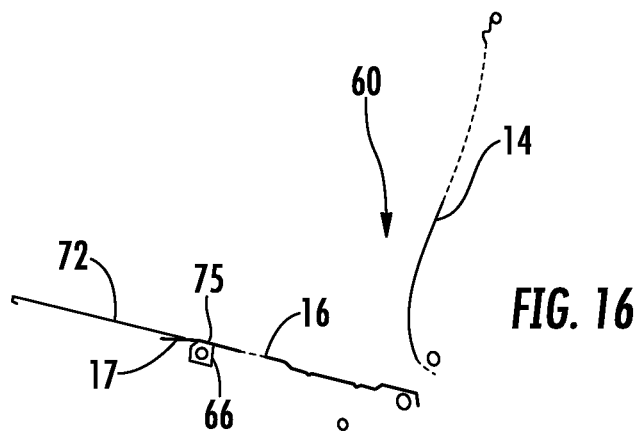
FIG. 16 is a schematic sectional view showing the vehicle seat of FIG. 12 and showing a seat base and spring panel connection.

FIG. 15 shows the vehicle seat of FIG. 12 with the seat base 16. As noted above, the spring base and spring panel connection 75 may be at least partially supported by the support base structure such as by the cross tube 66 and/or the seat floor engaging bracket 62. The vehicle front cross structure 66 is used in combination with a fixing to the seat base 16. FIG. 16 shows this vehicle front cross structure connection 75 schematically including a bolted connection of the upper panel 72 and lower panel 74 with the seat base 16 near the seat base front edge 17. This may instead be a connection in substance such as a weld. This connection is further supported by the support tube (vehicle front cross structure) 66 of the floor engaging bracket 62 of the vehicle support structure.

Figure 17:
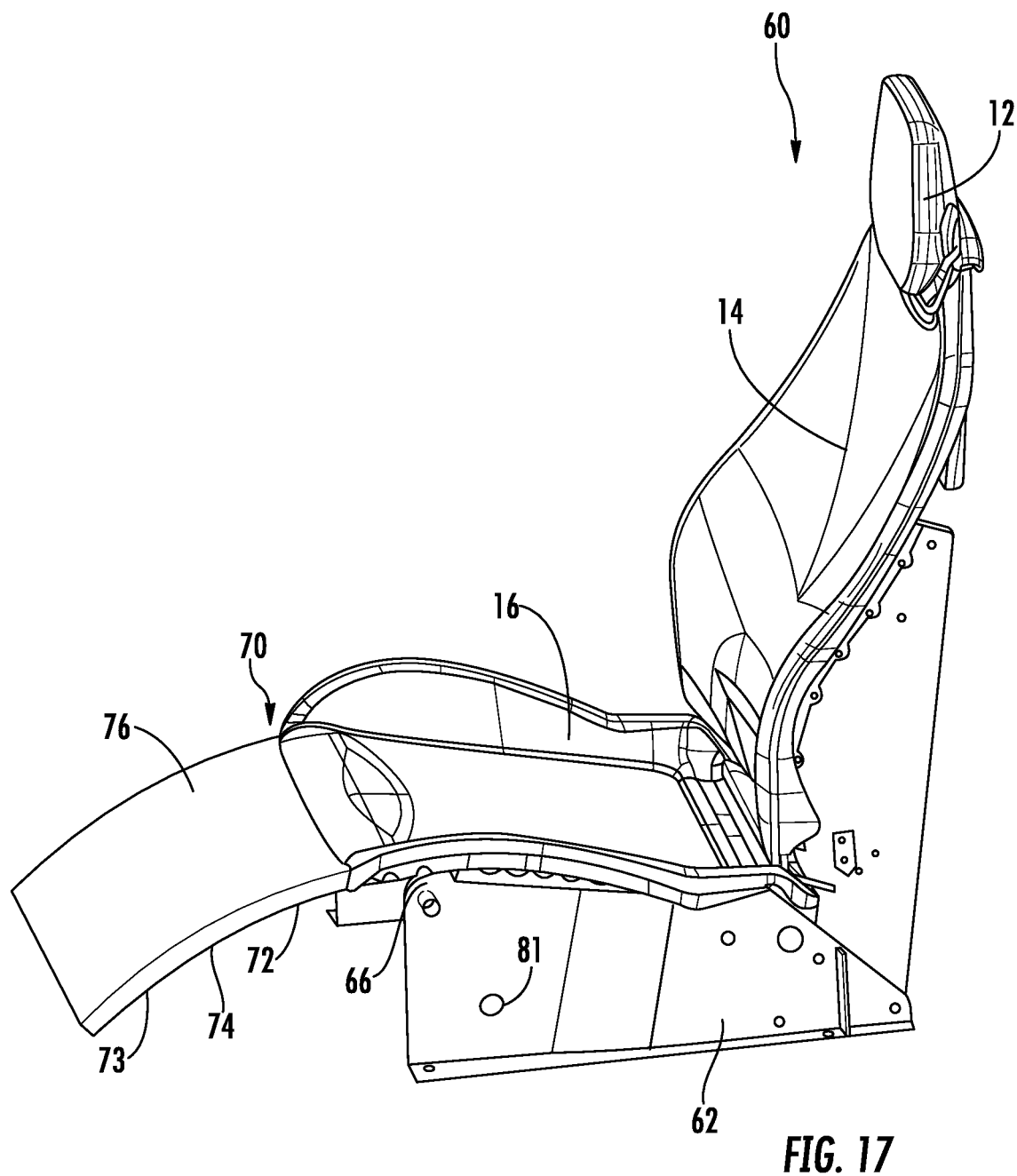
FIG. 17 is a perspective view of the vehicle seat of FIG. 12, including the seat base part as well as trim and foam on the seat back, the seat part and on the deflectable leg support.

FIG. 17 shows the vehicle seat 60 with trim and foam applied to each of the headrest 12, the seatback 14, the seat base 16 and with trim and foam 76 applied to the spring panel arrangement 70. The spring panel arrangement 70 may include a foam and trim engagement flange 78 which facilitates the support of the trim and foam and the connection of the trim and foam to the spring panel arrangement 70.

Figure 18:
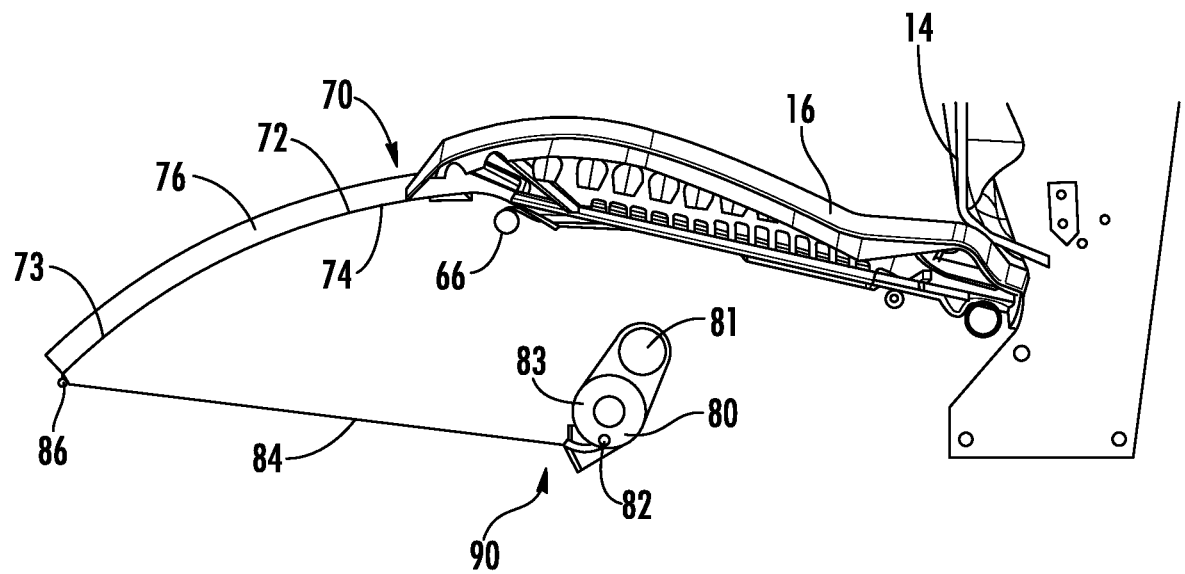
FIG. 18 is a partial side view of the vehicle seat of FIG. 12, showing the seat base with trim and foam and the deflectable leg support with trim and foam with the leaf spring configuration in a preloaded design state and showing a powered leg support positioning arrangement.
Figure 19:
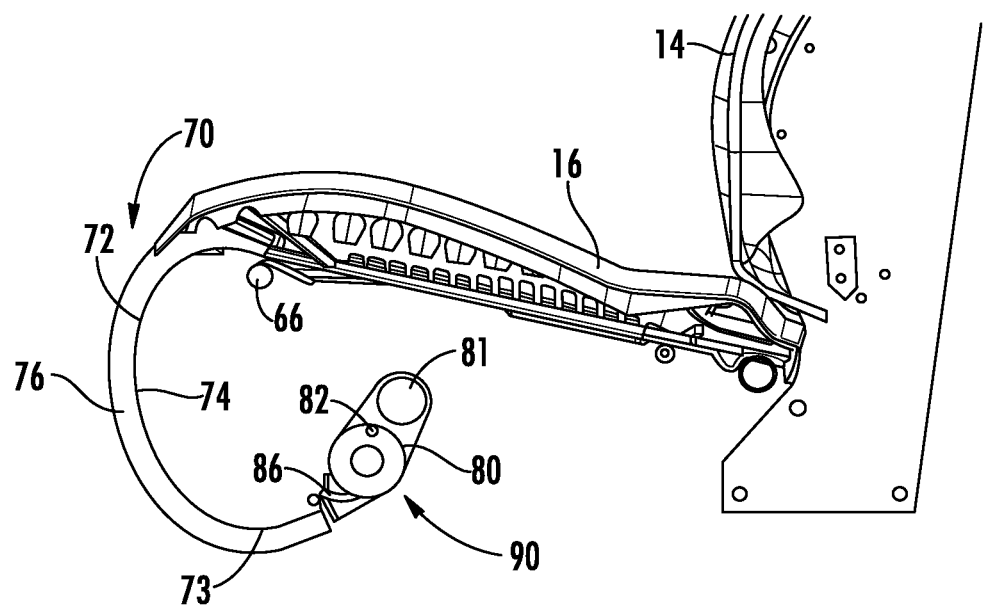
FIG. 19 is a partial side view corresponding to the showing of FIG. 18 but with the leaf spring configuration in a retracted design state and showing the powered leg support positioning arrangement.

FIG. 18 shows the vehicle seat of FIG. 12 with a powered leg support positioning arrangement generally designated 90. The positioning arrangement (clutch system) 90 includes a position motor 80 which drives a spool (reel/drum) 83 in rotation in either of two directions. The motor 80 is mounted on the support tube 81 which is supported by the support base 62/66/64. The spool/real 86 supports a cable 84 which is connected to the spool reel at 82 and is connected to the spring panel arrangement 70 at foot rest end connection 86. With this configuration, the motor 80 drives the real 86 to pull in the cable 84 to move the foot rest and connection 86 towards the spool reel connection 82. This moves the arrangement, particularly the spring panel arrangement 70, from the preloaded design state shown in FIG. 18 to the retracted design state as shown in FIG. 19.

Figure 20:
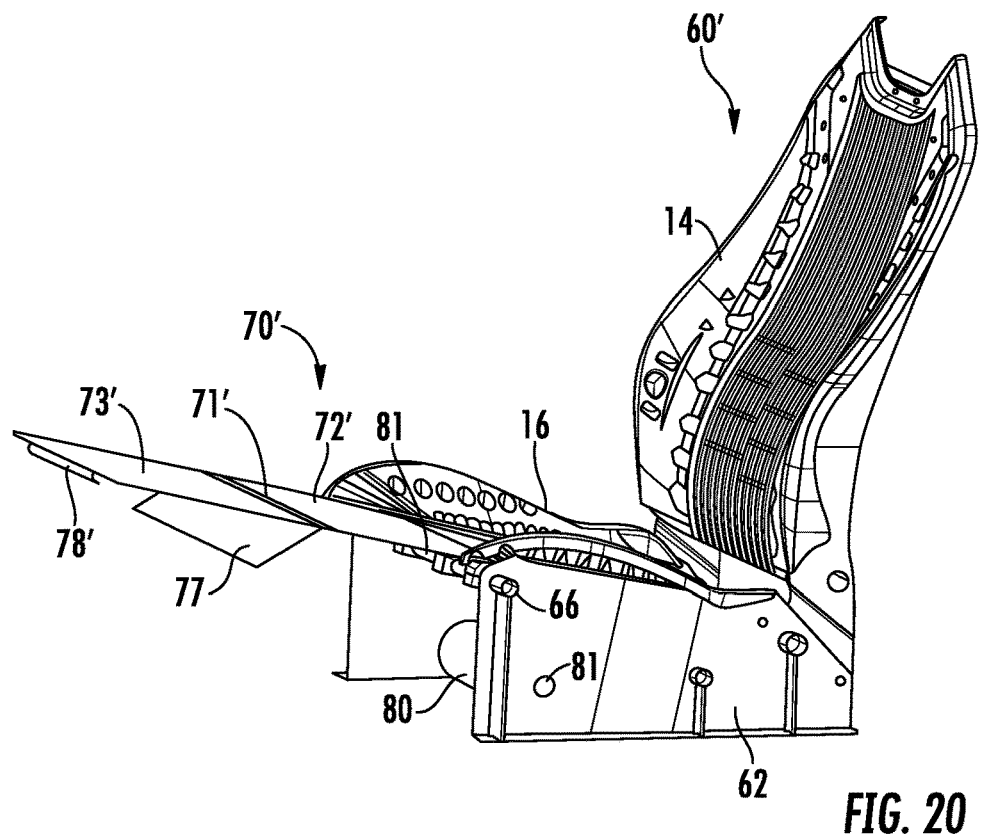
FIG. 20 is a perspective view showing an alternative embodiment of the vehicle seat according to FIG. 12, with the leaf spring configuration in an unloaded state.

FIG. 20 shows an alternative embodiment of the vehicle seat 60' that includes an alternative embodiment of a spring panel arrangement 70'. The spring panel arrangement 70' is again formed with a plurality of spring panels. These are preferably again made of either different materials and/or different thicknesses. In particular, the upper proximal spring panel 72' is made of a different thickness than the upper distal spring panel 73'. The upper proximal spring panel 72' and the upper distal spring panel 73' are joined together in substance (by welding) or by bolting at joining region 71'. Instead of simply using materials of different thicknesses, upper proximal spring panel 72' may cooperate with a lower proximal spring panel (spring layers), to provide the different stiffness as compared to the upper distal spring panel 73'. Further, at the joining region 71' an additional panel, or an extension of the upper proximal spring panel 72' is provided in the form of a stop flange 77. In the preloaded design state (FIG. 20) the stop flange 77 extends from the joining region 71 away from the upper surface as shown in FIG. 20. As the spring panel arrangement 70' is moved from the preloaded design state (FIG. 20) to the retracted design state (FIG. 21) the stop flange 77 acts as a stop to prevent a further deflection by the powered leg support positioning arrangement (clutch system) 90 as the motor 80 and connected cable 84 pull the foot rest end connection 86 under the vehicle seat 60'.

Figure 21:
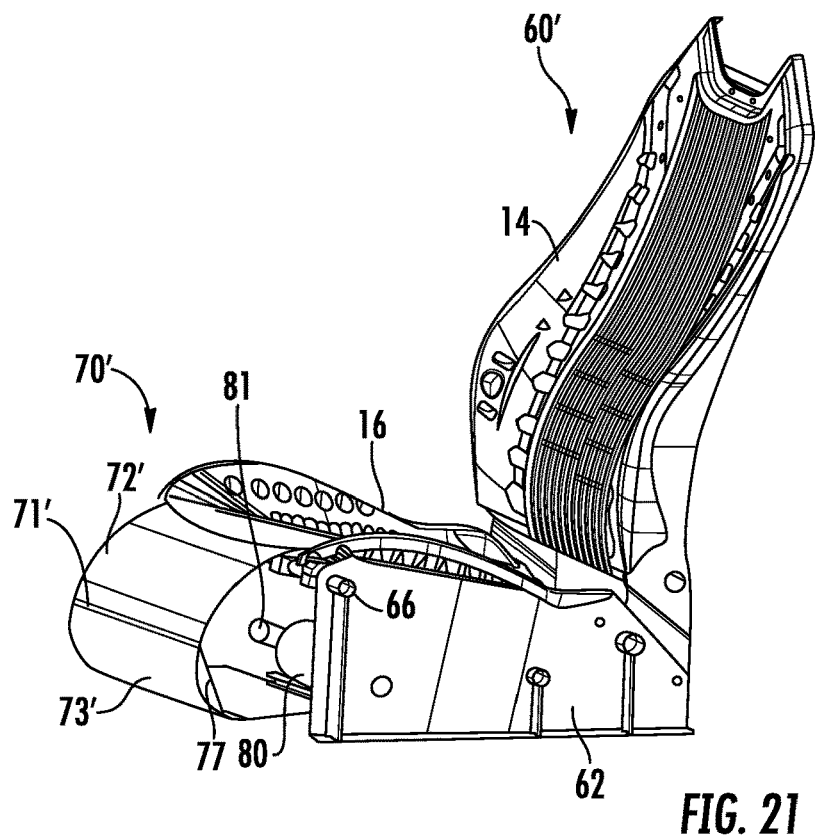
FIG. 21 is a perspective view corresponding to the showing of FIG. 20, but with the leaf spring configuration in a retracted design state.

In the embodiment of FIGS. 20 and 21 the upper, proximal spring panel 72', and/or a lower panel, provides a thicker spring structure than the upper distal spring panel 73'. By using different materials distortion is controlled. The arrangement 70' is made from two springs (spring panel 72 and spring panel 73) with the spring panel 72 attached to seat base structure 16 at 75 being thicker and being formed with the flange 77. The second panel, spring panel 73, is thinner and deforms first eventually hitting stop flange and limiting stress thereof. This configuration also makes it such that the whole panel arrangement 70 can have an end 78 tucked under seat.

Although various examples of spring panel arrangements have been disclosed, it should be appreciated that various configurations and combinations of panels with different panel thicknesses and different materials may be provided to achieve different effects. By making panels of different thickness they may be configured and arranged to manage a deflection rate along the panel or provide unique deflection characteristics. Besides providing panels of different thicknesses and different materials and providing panel arrangements with various configurations using different thicknesses and different materials, individual panel members may be coated or laminated to provide different characteristics. Configurations with plural spring panels can be provided as a laminate spring, similar to a leaf spring on automobiles. Further substrate elements (layers) may be provided between spring panels to allow for displacement between the spring panels with lower effort/noise. Further, if the needs/requirements of the panel are minimal, the panel may be constructed from a single sheet of spring steel.

The panel arrangement 70 may have an overmolded edge treatment arrangement, particularly material applied at the edges. This removes sharp edges and aids in attaching the trim to the panel arrangement 70.

Although a powered drive is disclosed, a manual arrangement may be provided. The motor 80 is replaced with a crank or a lever which rotates the drum/reel 83. A transmission may be provided between the pivoting lever and the drum/reel 83, to set the rate of real 83 rotation. For example, the lever may be provided that is connected to the drum/reel 83 by the transmission such that moving the lever to a fully forward position rotates the drum/reel 83 resulting in the panel arrangement 70 being moved to the retracted position (FIGS. 19 and 21). The lever may be moved to a fully rearward position rotating the drum/reel 83 in an opposite direction, which results in the panel arrangement 70 being moved to the preloaded design state (FIG. 18). Another example comprises a lever attached to a clutch system which provides a pumping action to drive the drum/reel 83 in rotation.

While specific embodiments of the invention have been shown and described in detail to illustrate the application of the principles of the invention, it will be understood that the invention may be embodied otherwise without departing from such principles.

LIST OF REFERENCE CHARACTERS 10 vehicle seat
12 headrest
14 backrest (seatback)
16 seat base (cushion)
17 seat base front edge
18 backrest support connection
20 vehicle floor engaging bracket
22 linking bracket
24 pivot bracket
30 ottoman arrangement (leg rest arrangement)
31 panel distal end
32 support assembly
33 panel and bracket connection area
34 deflectable leg support panel
35 crossmember portion
36 cantilever brackets/bracket portions
37 cantilever assembly
38 support tube
39 driven gear
40 motor
42 drive gear
46 motor transmission
50 foam pad
60 vehicle seat
60' vehicle seat
62 vehicle floor engaging brackets
64 cross tube
70 spring panel arrangement
70' spring panel arrangement the leaf spring configuration
71 joining region
71' joining region
72 upper proximal spring panel
72' upper proximal spring panel
73 upper distal spring panel
73' upper distal spring panel
74 lower proximal spring panel
75 seat base spring panel connection at vehicle front cross structure
75' seat base spring panel connection at vehicle front cross structure
76 leg rest trim/foam
77 stop flange
78 foam/trim engagement flange
78' foam/trim engagement flange
80 positioning motor
81 motor support
82 motor reel connection end
83 cable reel/drum
84 positioning cable
86 foot rest end connection
90 powered leg support clutch system positioning arrangement
340 deflectable leg support panel
342 plastic structure
344 annular metal support

What is claimed is:

1. A vehicle seat comprising:
a seat base;
a backrest connected to the seat base; and
a leg rest assembly comprising a plurality of deflectable sheet spring steel leg support panels superposed upon each other in a leaf spring configuration, wherein each of the plurality of panels has a first edge and a second edge opposite the first edge, wherein the plurality of panels comprises different dimensions between the first and second edges of respective panels, wherein the first edge of the plurality of panels is fixed to the seat base on a common axis, and wherein the second edge of at least one of the panels is movably connected to a winding mechanism by a cable, said deflectable leg support panel deflecting under a load of legs of the user and returning with a restoring force back to an initial position upon removing the load of the legs of the user.

2. A vehicle seat according to claim 1, wherein the leg rest assembly comprises brackets connected to the deflectable leg support panel and connecting the vehicle seat to the deflectable leg support panel, the deflectable leg support panel deflecting relative to the brackets.

3. A vehicle seat according to claim 1, wherein said deflectable leg support panels comprise elastic cantilever members extending from a vehicle front cross structure.

4. A vehicle seat according to claim 3, wherein said vehicle front cross structure is formed from a tube and forms said axis as an only pivot axis of the leg rest assembly.

5. A vehicle seat according to claim 4, wherein brackets interconnect the elastic cantilevered members and the tube.

6. A vehicle seat according to claim 3, wherein the elastic cantilever members comprise a plurality of layers of sheet spring steel creating a leaf spring providing a controlled shape.

7. A vehicle seat according to claim 3, wherein the elastic cantilever members comprise of several layers of sheet spring steel, wherein the layers define a spring rate that is set based on the selection of the layers of sheet spring steel.

8. A vehicle seat according to claim 3, further comprising a foam part fixed to a leg engagement surface of the elastic cantilever member.

9. A vehicle seat according to claim 3, wherein the shape and preload of the leg rest assembly is controlled by loading the at least one of the panels via the cable at the second edge of the at least one of the panels.

10. A vehicle seat according to claim 9, wherein the cable is extended or retracted via a manual clutching system.

11. A vehicle seat according to claim 9, wherein the cable is extended or retracted via a power drive mechanism.

* * * * *